(12) United States Patent
Coish et al.

(10) Patent No.: US 9,672,702 B2
(45) Date of Patent: Jun. 6, 2017

(54) THERMAL HAPTIC ALERT NOTIFICATION

(71) Applicant: Apple Inc., Cupertino, CA (US)

(72) Inventors: Robert L. Coish, Mountain View, CA (US); John A. Porcella, Morgan Hill, CA (US); John S. Camp, San Francisco, CA (US); Kyle J. Nekimken, San Jose, CA (US); Michael A. Damianakis, San Francisco, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 15/091,510

(22) Filed: Apr. 5, 2016

(65) Prior Publication Data

US 2017/0084137 A1   Mar. 23, 2017

Related U.S. Application Data

(60) Provisional application No. 62/222,717, filed on Sep. 23, 2015.

(51) Int. Cl.
*H04B 3/36*   (2006.01)
*G08B 6/00*   (2006.01)

(52) U.S. Cl.
CPC ..................... *G08B 6/00* (2013.01)

(58) Field of Classification Search
CPC   G08B 6/00; G06F 3/016; G06F 3/041; G01C 21/34

USPC ............................. 340/407.1, 407.2
See application file for complete search history.

(56) References Cited

U.S. PATENT DOCUMENTS

| | | | |
|---|---|---|---|
| 8,593,409 B1 | 11/2013 | Heubel et al. | |
| 8,665,241 B2 | 3/2014 | Heubel et al. | |
| 2009/0106655 A1* | 4/2009 | Grant | G06F 1/3231 715/702 |
| 2009/0120105 A1 | 5/2009 | Ramsay et al. | |
| 2012/0116672 A1* | 5/2012 | Forutanpour | G01C 21/20 701/431 |
| 2014/0217091 A1* | 8/2014 | Ho | H02J 5/005 219/660 |
| 2015/0185764 A1* | 7/2015 | Magi | G06F 1/1652 361/679.03 |
| 2016/0187977 A1* | 6/2016 | Cruz-Hernandez | G06F 1/163 345/156 |

* cited by examiner

*Primary Examiner* — Tai T Nguyen
(74) *Attorney, Agent, or Firm* — Zachary D. Hadd (57) ABSTRACT

This application relates to computing devices that can incorporate thermal haptic feedback devices for providing feedback in the form of a temperature change. The thermal haptic feedback device can be incorporated into a watch, and a portion of the watch can change temperature when a notification is to be provided to a user. The thermal haptic feedback device can also be incorporated into a surface of a mobile phone and allow a user to receive notifications regarding incoming calls and messages using a temperature change of the surface. The thermal haptic feedback device can also change temperature based on information received from external computing devices.

16 Claims, 5 Drawing Sheets

THERMAL HAPTIC ALERT NOTIFICATION

CROSS-REFERENCE TO RELATED APPLICATIONS

The present application claims the benefit of U.S. Provisional Application No. 62/222,717, entitled "THERMAL HAPTIC ALERT NOTIFICATION" filed Sep. 23, 2015, the content of which is incorporated herein by reference in its entirety for all purposes.

FIELD

The described embodiments relate generally to thermal haptic feedback devices. More particularly, the present embodiments relate to using thermal haptic feedback devices to provide feedback to a user of a computing device.

BACKGROUND

Computing devices often provide a variety of indications to a user through devices such as display devices and audio devices. In some computing devices, motors or solenoids are incorporated to provide vibrational feedback to users of the computing devices. However, because motors and solenoids can be bulky and occupy a relatively large amount of space within certain computing devices, the benefit of providing such vibrational feedback can be spoiled by the amount of space occupied by the motors and solenoids.

SUMMARY

This paper describes various embodiments that relate to thermal haptic feedback devices for computing devices. In some embodiments a computing device is set forth as having a housing configured to support a logic circuit, and a power supply configured to power the logic circuit. The computing device can also include a thermal haptic feedback (THF) device connected to the logic circuit. The THF device can be configured to change temperature based on a signal received from the logic circuit. Additionally, the computing device can include a wireless transmitter configured to connect to an external computing device. Furthermore, the logic circuit can be configured to control the THF device based on data received from the external computing device.

In other embodiments, a system is set forth. The system can include a thermal haptic feedback device comprising an array of thermoelectric elements. The system can also include a logic circuit configured to control the activation of each thermoelectric element of the array of thermoelectric elements according to a predetermined pattern. In some embodiments, the system can include a watch body and a watch strap connected to the watch body, such that the array of thermoelectric elements are disposed across a length of the watch strap.

In yet other embodiments, a method is set forth for operating a thermal haptic feedback (THF) device connected to a computing device. The method can include the steps of determining that feedback is to be provided by the computing device, generating a feedback signal for the THF device, and causing the THF device to change temperature based on the feedback signal. Additionally, the method can include receiving a signal from an external computing device that is either a portable device or a server device, and the feedback signal can be based on the signal from the external computing device.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Computing devices have become more compact and portable over time because of advances in technology that have allowed certain components to be drastically reduced in size. However, many components, such as haptic feedback devices, can be difficult to reduce in size because of they can require weights and springs to effectuate physical feedback that is exhibited during operation of such components. The embodiments discussed herein can be used to replace such components in certain computing devices and make the computing devices more compact or make space for other components within the computing devices. For example, in some embodiments, a thermal haptic feedback (THF) device can be incorporated into a computing device. The THF device can change temperature based on a signal from the computing device in order to provide some amount of thermal feedback to a user of the computing device. The THF device can therefore be used to provide notifications to a user by changing temperature at a location of the computing device where the user can feel the temperature change. The temperature change can be any amount of temperature change that is suitable for a user to detect. For example, in some embodiments of the THF device, the temperature change is at least between 0.5 and 2 degrees. Furthermore, the temperature change can be an increase in temperature or a decrease in temperature.

In some embodiments, the THF device is incorporated into a mobile computing device and is arranged to change the temperature of a surface of the mobile computing device.

The THF device can include one or more thermoelectric heating and/or cooling elements that can change temperature according to a programmed pattern. For example, the thermoelectric elements can be arranged in an array across a surface of the computing device. When the computing device is a watch, a strap of the watch can include the thermoelectric elements and/or a body of the watch can include the thermoelectric elements. In this way, a user of the watch can feel a change in temperature around their wrist when wearing the watch. When an array of thermoelectric elements are incorporated in the THF device, each thermoelectric element can be adjacent to a material that is different than the thermoelectric element, such as a material containing metal (e.g., steel), glass, or plastic. Additionally, the thermoelectric element can be any thermoelectric element suitable for heating or cooling a surface. For example, in some embodiments, the thermoelectric element is a device that operates according to the peltier effect, and in other embodiments, the thermoelectric element is a resistive heating element, including but not limited to nichrome wire. The computing device can include settings for adjusting the temperature change and pattern associated with certain notifications. For example, a user can set a call notification to be a pattern that travels around the wrist or over the surface of the computing device, and a lower battery notification to be discrete pattern that periodically warms or cools the entire wrist area of the user or a surface of the computing device. In some embodiments, the THF device can be used to generate power to charge a battery of the computing device. For example, when the THF device is a device that operates according to the peltier effect, a difference in temperature created at the THF device by the body of the user or some other area separate from the THF device can be used to generate electricity. The electricity can thereafter be provided to a charging circuit of the computing device to charge the battery of the computing device.

In some embodiments, the THF device can be used to create a tingling sensation at a surface of the computing device that contacts the skin of a user. The tingling sensation can be created in a variety of ways. For example, in some embodiments, the THF device is an array of thermoelectric elements that are each randomly turned on and off, or otherwise set to heat and cool randomly. In this way, areas of skin within a perimeter of the THF device will be randomly heated and cooled to give a tingling effect. In other embodiments, the heating and cooling of the thermoelectric elements can be performed according to a predetermined pattern for creating a sensation of tingling at the skin area. In yet other embodiments, when the computing device is a watch with a band or strap, the strap can be caused to expand and contract using one or more thermoelectric elements and a gas within the band. When the gas is heated, the gas will increase in pressure thereby causing the strap to expand around a wrist of the user of the computing device. The expansion can be performed in response to a notification that is generated or received at the computing device.

In some embodiments where the computing device is a watch, the watch can have one or more thermoelectric elements on or below a surface of the watch. For example, a surface of the watch that is opposite the display of the watch (e.g., the surface that typically contacts the skin or wrist of a user) can include thermoelectric elements. The thermoelectric elements can alternate hot and cold, or on and off, in a pattern that is predetermined or random. Similarly, the computing device can be a ring for a finger of a user. The ring can include one or more thermoelectric elements that can alternate hot and cold, or on and off, in a pattern that is predetermined or random. The ring can connect to a watch device, a cellular phone, laptop, or desktop computing device using any suitable wireless communication protocol (e.g., Bluetooth, cellular, Wi-Fi).

In yet other embodiments, a watch is set forth with a strap that includes a memory metal. The memory metal can be arranged to change shape when heated, cooled, and/or when an electrical current is received by the memory metal. The strap can therefore expand and contract according to the shape changing movements of the memory metal. For example, in order to provide the user of the watch with a notification, the memory metal that extends through a portion of the strap can be caused to expand and/or contract. This expansion and contraction can be effectuated by changing the temperature of the memory metal using a thermoelectric element, or sending an electrical current through the memory metal. As a result, a user can feel the strap become tighter and looser as the memory metal contracts and expands.

In yet other embodiments, the THF device can be at least partially controlled by an external device. For example, the THF device of a mobile device can be controlled by an application of an external computing device. The application can be a controls application, game application, configuration application, or any other application suitable for controlling temperature of a device. For example, the THF device can be included in multiple mobile devices and each THF device can be controlled by a gaming application in which the multiple mobile devices are participating. Additionally, a host device of the multiple mobile devices can be designated as a temporary controller of the game application of the one or more of the multiple mobile devices. In this way, when the gaming application is one that can be assisted by a warm or cold temperature feedback, the THF device of each mobile device can assist in game play by providing physical feedback to the players of the game. An example of such a game is a guessing game where users who guess an answer to a question that is close to the right answer may feel warmer sensation from their mobile device compared to those users who guess an answer that is not close to the right answer. Another example of a game that can use the THF device is a battle related game, where a player of the game can be notified that they have been injured in the game using a temperature change of the THF device.

In yet other embodiments, the THF device of a mobile device can be used to provide a reference for a temperature of another location. For example, a user can have a thermostat that controls the temperature of their home or their car. When the user is away from their home or car, the user can not only see what the temperature of their home or car by looking at the display of their mobile device, but also feel the temperature of their home or car through the THF device of their mobile device. For example, when the user is away from their home or car during the winter and the user wants to compare the temperature of their home or car to their current location (e.g., a warmer location), the user can access a thermostat related application. The thermostat application can warm or cool a surface of their mobile device to the temperature of their home or car in order to provide a temperature reference for the user of the mobile device. In yet other embodiments, the THF device can be at least partially controlled by a social networking application, which can allow the user to feel the temperature at a location of one of their connections on the social networking application. For example, a user can have a friend who is on vacation in a warmer location than the user, and the user can access the temperature of the friend or the friend's location and thereafter feel the temperature using the THF device. In yet other embodiments, the computing device can include a camera that can capture infrared images or video, and the computing device can be programmed to change a temperature of the THF device based on the infrared images and/or video. In this way, the user can feel a temperature of another location or surface captured in the infrared images and/or video.

In some embodiments, the THF device is connected to a laptop computing device. The laptop can include the THF device at a surface of the laptop where a user typically places their wrist or palms. In this way, the THF device can be used to provide thermal feedback to a user of the laptop, or otherwise cool down or heat up the skin of a user via a surface of the laptop. In yet other embodiments, the THF device can be incorporated into a touchpad of the laptop and/or one or more keys of a keyboard in order to provide thermal feedback to a user via a surface of the touchpad or the keys of the keyboard. The feedback can be provided according to any of the embodiments discussed herein (e.g., when a message is received or based application data). A front cover or back cover of the laptop computing device can include the THF device for providing thermal feedback to a user when the laptop is in a closed or open arrangement. In this way, when the laptop is closed, a user can still determine when a notification is being received by an application running on the laptop by touching a surface of the closed laptop. The THF device can be incorporated into any surface of a laptop computing device that is suitable for providing thermal feedback to a user of the laptop. The embodiments discussed herein are also applicable to a tablet computing device, which can be designed to provide thermal feedback through one or more surfaces of the table computing device.

In yet other embodiments, the THF device can be incorporated into a stylus device that can be used to input data to a display of a computing device. The THF device of the stylus can be controlled by a computing device connected to the stylus via a wireless communication protocol. The THF device can also be controlled by a logic circuit within the stylus. For example, when a user of the stylus is depressing the stylus against a surface, the THF device can change a temperature of a surface of the stylus in a way that allows the user to determine how hard they are pressing the stylus against the surface. In this way, the THF device can increase a temperature of the stylus when the stylus is being pressed more than a certain pressure, and the THF device can decrease a temperature of the stylus when the stylus is not being pressure more than the certain temperature. Additionally, when the stylus is being used to draw on a tablet computing device that is running a drawing application, the THF device can change a temperature of a surface of the stylus based on the color being input to the drawing application. For example, the THF device can be configured to reduce a temperature of the stylus when the stylus is drawing a blue color and increase the temperature of the stylus when the stylus is drawing a red color. Additionally, the THF can be configured to reduce a temperature of the stylus when the stylus is drawing a dark color and increase the temperature of the stylus when the stylus is drawing a bright color, or vice a versa.

These and other embodiments are discussed below with reference to FIGS. 1A-6; however, those skilled in the art will readily appreciate that the detailed description given herein with respect to these figures is for explanatory purposes only and should not be construed as limiting.

Figure 1A:
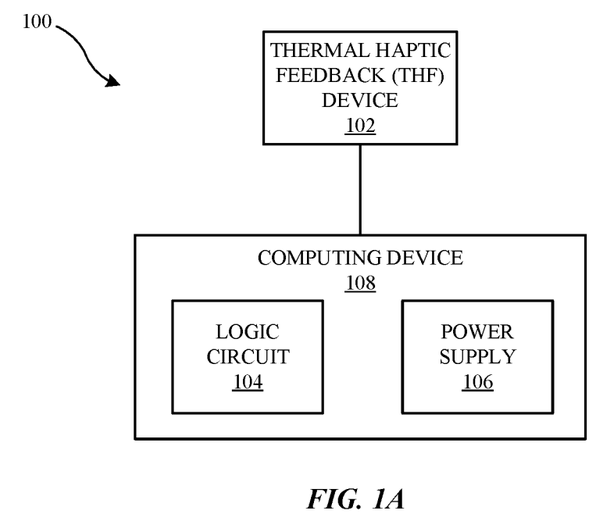
FIGS. 1A and 1B illustrate systems that can incorporate one or more thermal haptic feedback devices.

FIG. 1A illustrates a system diagram 100 of a computing device 108 that is connected to a thermal haptic feedback (THF) device 102. The computing device 108 can be a cellular phone, a watch, a media player, a desktop computer, a tablet computer, a television, or any other type of computing device. The computing device 108 can include a logic circuit 104 that can be programmed to perform any processing associated with any of the embodiments discussed herein. The logic circuit 104 can include a processor and a memory that stores instructions that are executable by the processor. The logic circuit 104 can be programmed to control the THF device 102 using power from a power supply 106 of the computing device 108. The power supply 106 can be any source of voltage or current such as one or more batteries, capacitors, photovoltaic supplies, and/or any other suitable source of electrical charge. When the THF device 102 is activated by the logic circuit 104, the THF device 102 can change temperature. The change in temperature can be an increase in temperature, a decrease in temperature, or some sequence of changes between different temperatures as discussed herein. In some embodiments, the computing device 108 can include a wireless transmitter, and the logic circuit 104 can control the THF device 102 based on a signal received at the wireless transmitter from an external computing device. For example, the external computing device can be a mobile device or a server device that hosts an application for controlling the THF device 102 of the computing device 108.

Figure 1B:
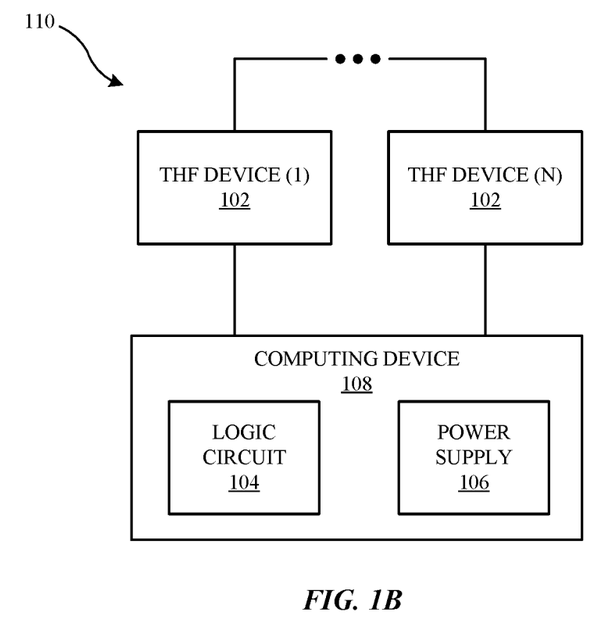

FIG. 1B illustrates a system diagram 110 of an embodiment of the computing device 108 that is connected to multiple THF devices 102. Specifically, FIG. 1B illustrates an array of THF devices 102 connected to the computing device 108. The ellipses of FIG. 1B are provided to indicate that any number of THF devices 102 can be connected between THF device (1) 102 and THF device (N) 102, where N is any whole number. The logic circuit 104 can be programmed to cause the temperature of each of the THF devices 102 to change in a random or non-random pattern. For example, each THF device 102 can be sequentially activated such that at least one THF device 102 is turned on and off before another THF device 102 is turned on and off. Such activation of THF devices 102 can simulate a temperature change across a surface of the computing device 108.

Figure 2A:
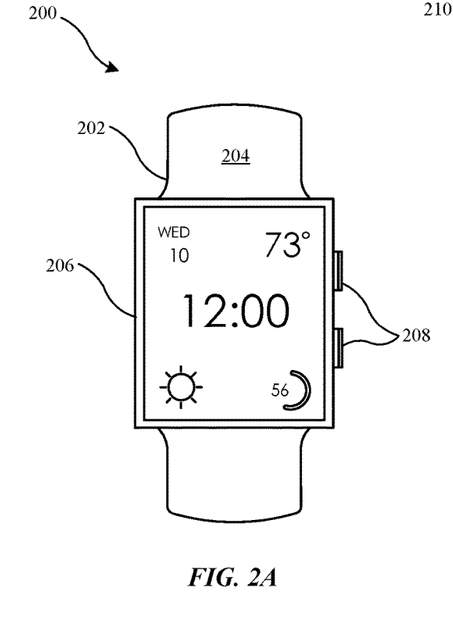
FIGS. 2A-2C illustrate watches that can incorporate one or more thermal haptic feedback devices in the watch body and/or the watch strap.
Figure 2B:
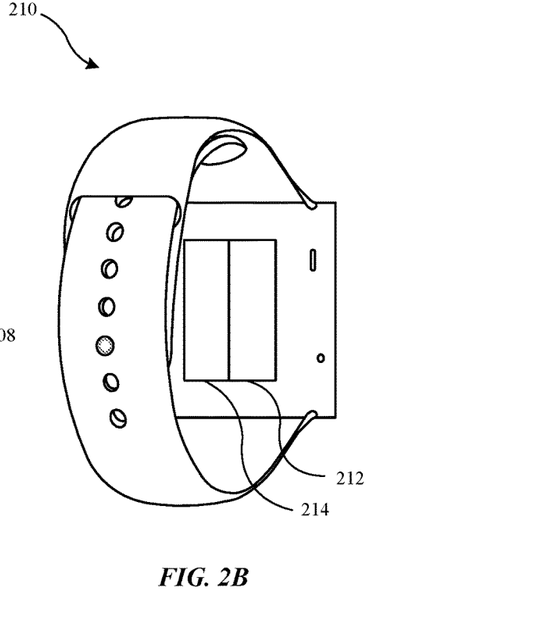
Figure 2C:
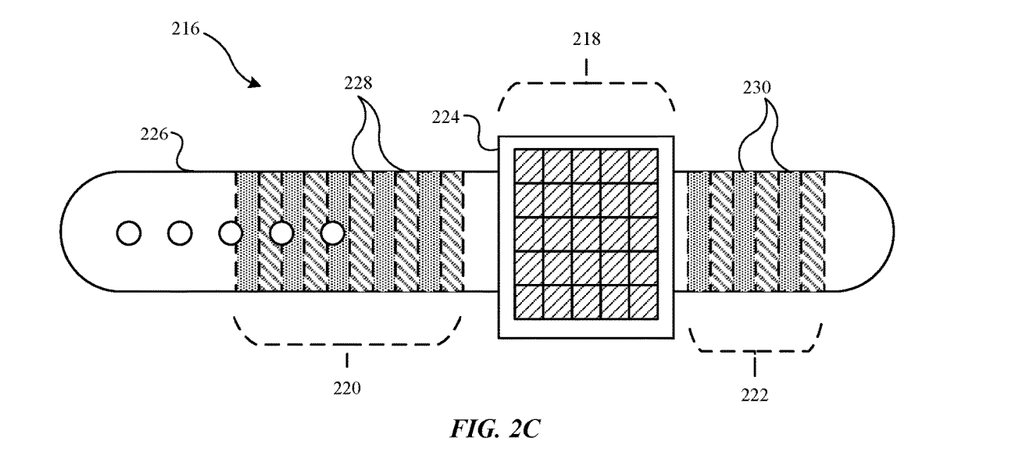

FIGS. 2A-2C illustrate embodiments of a watch 202 that can incorporate the THF device 102 or any other feedback device discussed herein. FIG. 2A illustrates a perspective view 200 of a watch 202 that can include a watch body 206 that can include a display for displaying outputs from one or more applications stored on the watch 202, as illustrated in FIG. 2A. The watch 202 can further include a strap 204 and one or more dials 208 for controlling features and applications of the watch 202. Each of the watch body 206, the strap 204, and/or the dials 208 of the watch 202 can include the THF device 102. For example, the THF device 102 can be incorporated into the watch body 206 for changing the temperature of a first surface 212 and a second surface 214 of a rear surface of the watch body 206, opposite the display of the watch 202, as illustrated in FIG. 2B. Specifically, FIG. 2B illustrates a perspective view 210 of a backside of the watch body 206, opposite the display of the watch 202. Each of the first surface 212 and the second surface 214 can be connected to separate THF devices 102 such that each of the first surface 212 and the second surface 214 can separately undergo a temperature change. For example, in some embodiments the watch 202 can be programmed to sequentially heat up or cool down the first surface 212 and then heat up or cool down the second surface 214. When the watch 202 is being worn by a user, a wrist of the user will feel a temperature change across the wrist. The temperature change can be at least a change of 0.5 to 2 degrees, or more than 2 degrees.

FIG. 2C illustrates a perspective view 216 of a watch that includes a watch body 224 and a strap 226. In some embodiments, the watch body 224 can include an array of THF devices 218 that are each controlled separately by a logic circuit of the watch. The watch can also include the strap 226, which has a first array of THF devices 220 and a second array of THF devices 222 that can be controlled separately by the logic circuit of the watch. The first array of THF devices 220 and the second array of THF devices 222 can include multiple thermoelectric elements 228 each separated by a spacer 230. The spacers 230 can include any material such as metal, glass, plastic, or any material suitable for maintaining a temperature at a surface of a device while an area near the spacer 230 changes temperature. Each of the thermoelectric elements 228 can be activated sequentially across the strap 226. For example, thermoelectric elements 228 can be activated in a pattern that can give a user the feeling that a temperature change is occurring around the wrist or otherwise traveling around a perimeter of the wrist. The thermoelectric elements can include conductive wire such as nichrome wire, and/or any device operating according to the peltier effect. Furthermore, each of the thermoelectric elements 228 of the strap 226 can be replaced by memory metal for expanding and contracting the strap 226 in a way that the user can feel a change in pressure from the strap 226 when the watch is providing a notification. Furthermore, the thermoelectric elements 228 can include gas pockets, which can expand and contract according to an operation of the thermoelectric elements 228. In this way, when a notification is to be provided by the watch, the strap 226 can expand and contract using the gas within the gas pockets and a change in temperature of the thermoelectric elements 228.

Figure 3:
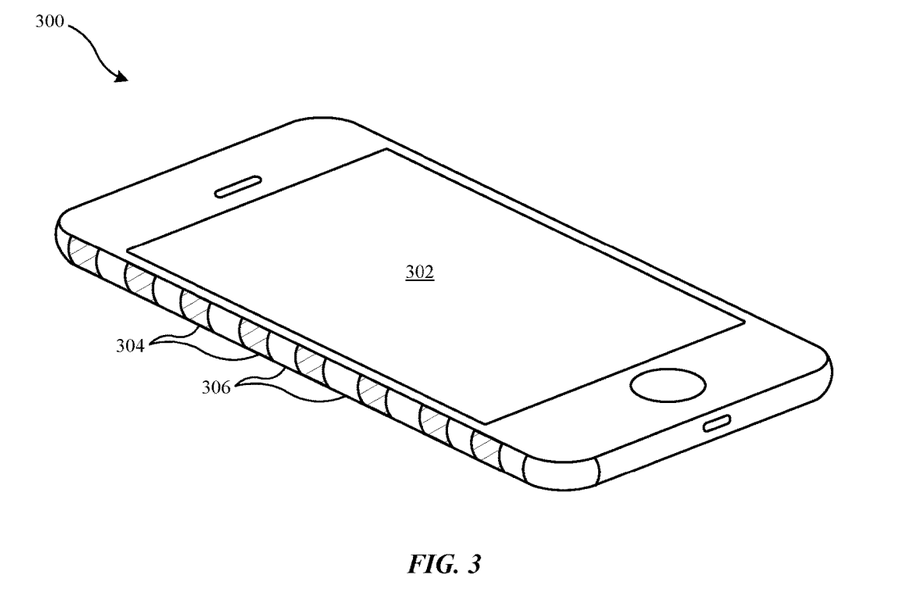
FIG. 3 illustrates a mobile device that can incorporate one or more thermal haptic feedback devices.

FIG. 3 illustrates a perspective view 300 of a computing device 302 that includes THF devices 304 at an edge of the computing device 302. In some embodiments, the THF devices 304 are separated by a spacer 306, as discussed herein. The THF devices 304 can be activated by the computing device 302 when a notification is provided by the computing device 302. For example, the THF devices 304 can change temperature when an incoming call is being received by the computing device 302, when a message is received by the computing device 302, when a calendar reminder is being executed by the computing device 302, when a game is being played by a user of the computing device 302, and/or another time when it is suitable for a change in temperature to be provided by the THF devices 304. In some embodiments, the THF devices 304 can imitate the temperature of another location, such as a temperature at a home or car of the user, or a temperature of a location near a contact or friend of the user. Additionally, a THF devices 304 can be controlled by another device that is owned or not owned by the user of the computing device 302. In this way, another device can control the THF devices 304 during a group game that involves the other device and the computing device 302. In some embodiments, the spacers 306 are not included in the computing device 302 and the THF devices 304 can extend continually or partially around a perimeter edge of the computing devices 302. The THF devices 304 can also be incorporated into a face of the computing device 302 that includes the display, or a back of the computing device 302 that is opposite the display. In some embodiments, the computing device 302 can be programmed to allow a user to adjust the amount of temperature change that can occur as a result of operating the THF devices 304.

Figure 4:
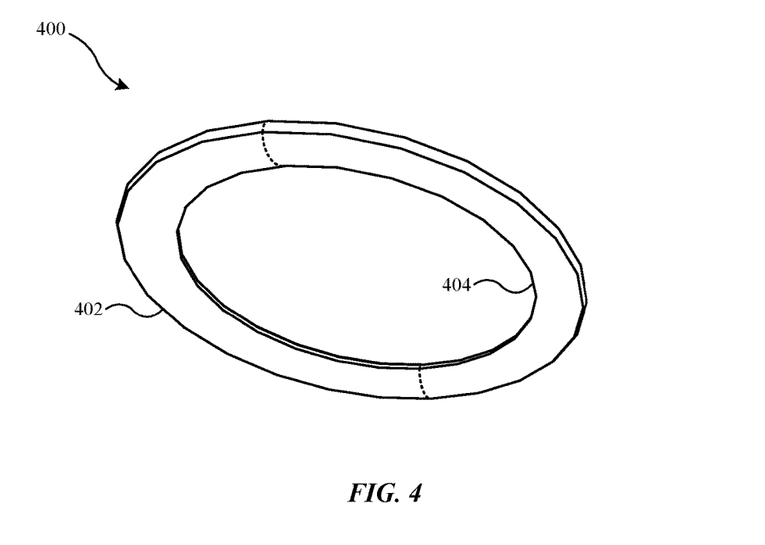
FIG. 4 illustrates a ring device that can incorporate one or more thermal haptic feedback devices.

FIG. 4 illustrates a perspective view 400 of a ring that can include the THF device 102. For example, the ring of FIG. 4 can include a first side 402 that includes a THF device and a second side 404 that includes another THF device. The ring of FIG. 4 can include a logic circuit for controlling the THF devices of the ring. In this way, when the ring generates a notification, the THF devices of the first side 402 and the second side 404 can be activated and provide thermal feedback to a user who is wearing the ring. When the user is wearing the ring, the ring will change in temperature according to the operation of the logic circuit. In some embodiments, the ring can be connected to another device such as a cell phone, laptop, desktop computer, tablet, car, or other device that can provide notifications to a user. In this way, the ring can be used as a notification device for the aforementioned devices. In some embodiments, the ring can include a single THF device that can change a temperature of the entire ring. In other embodiments, the ring can include more than two THF devices for changing the temperature of the ring.

Figure 5:
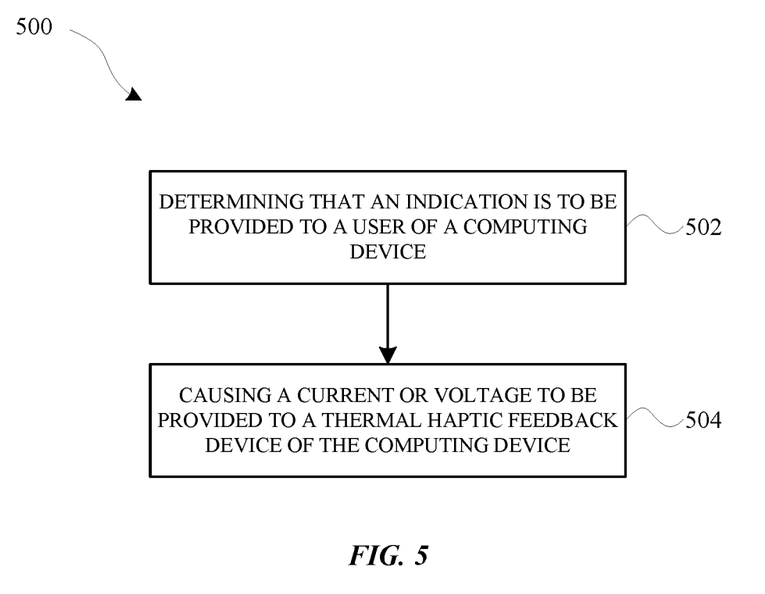
FIG. 5 illustrates a method for controlling a thermal haptic feedback device of a computing device.

FIG. 5 illustrates a method 500 for controlling a thermal haptic feedback device according to the embodiments discussed herein. The method 500 can be performed by any of the devices discussed herein. For example, the method 500 can be performed by a cell phone, watch, laptop computer, desktop computer, tablet computer, media player, or any other device suitable for providing notifications. The method 500 can include a step 502 of determining that an indication is to be provided to a user of the computing device. The indication can be associated with an incoming call, incoming message, or any other notification associated with software of a computing device. The method 500 can further include a step 504 of causing a current or voltage to be provided to a thermal haptic feedback device of the computing device. The thermal haptic feedback device can be any of the thermal haptic feedback devices discussed herein.

Figure 6:
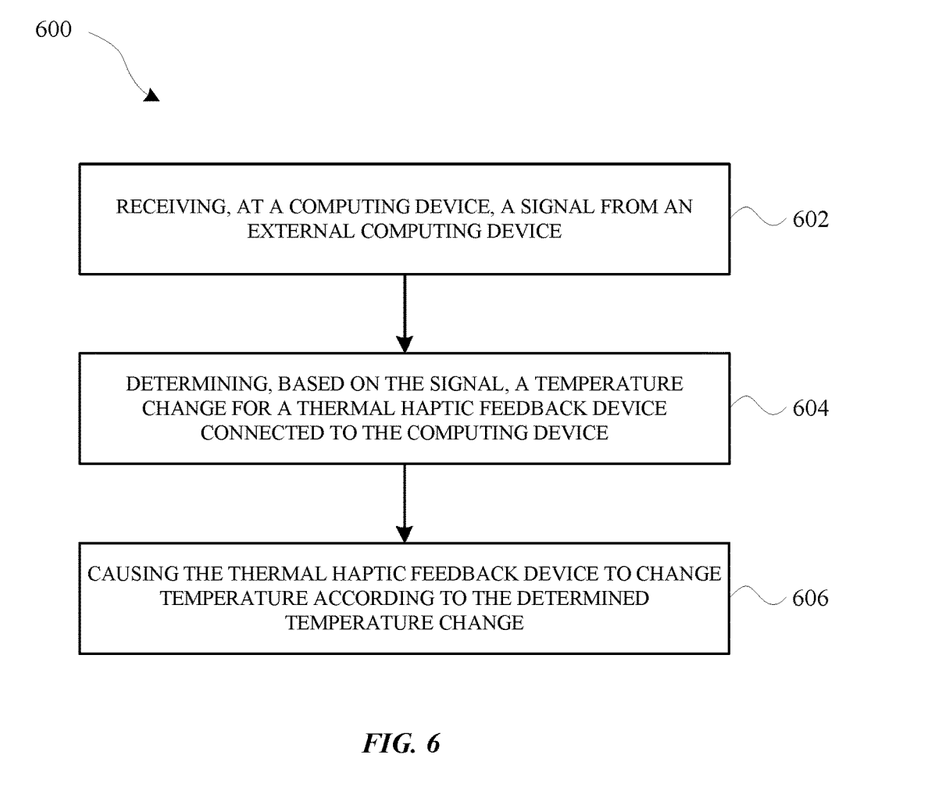
FIG. 6 illustrates a method for controlling a thermal haptic feedback device of a computing device based on signals from an external computing device.

FIG. 6 illustrates a method 600 for controlling a thermal haptic feedback device based on a signal received from an external computing device. The method 600 can be performed by any of the devices discussed herein. For example, the method 600 can be performed by a cell phone, watch, laptop computer, desktop computer, tablet computer, media player, or any other device suitable for providing notifications. The method 600 can include a step 602 of receiving, at a computing device, a signal from an external computing device. The external computing device can be a mobile device or a server device. The signal can be associated with a command, notification, control signal, message, or any other data that can be provided by a computer. The method 600 can further include a step 604 of determining, based on the signal, a temperature change for a thermal haptic feedback device connected to the computing device. The method 600 can also include a step 606 of causing the thermal haptic feedback device to change temperature according to the determined temperature change. The temperature change can occur according to any of the embodiments of the thermal haptic feedback device discussed herein.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A computing device comprising:
a housing configured to support a logic circuit;
a power supply configured to power the logic circuit; and
a thermal haptic feedback (THF) device connected to the logic circuit, wherein the THF device is configured to change temperature based on a signal received from the logic circuit, wherein the computing device is a watch that includes a strap, wherein the THF device is incorporated into the strap and is configured to change a temperature of the strap, wherein the THF device includes an array of thermoelectric elements disposed within the strap, and wherein the signal is configured to cause each thermoelectric element of the array of thermoelectric elements to activate at different times.

2. The computing device of claim 1, further comprising:
a wireless transmitter configured to connect to an external computing device, wherein the logic circuit is configured to control the THF device based on data received from the external computing device.

3. The computing device of claim 1, further comprising a spacer within the strap, wherein the spacer is interposed between at least two thermoelectric elements of the array of thermoelectric elements.

4. The computing device of claim 1, wherein the THF device is a peltier device and the signal is a voltage signal.

5. The computing device of claim 1, wherein the THF device is a resistive heating element.

6. The computing device of claim 1, wherein each thermoelectric element of the array of thermoelectric elements is configured to activate at different times in response to a wireless signal from an external computing device.

7. A system comprising:
a thermal haptic feedback device comprising an array of thermoelectric elements;
a logic circuit configured to control an activation of each thermoelectric element of the array of thermoelectric elements according to a predetermined pattern; and
a watch body and a watch strap connected to the watch body, wherein the array of thermoelectric elements are disposed across a length of the watch strap, and wherein the predetermined pattern is configured to cause sections of the watch strap to sequentially change temperature.

8. The system of claim 7, wherein the array of thermoelectric elements includes resistive heating elements.

9. The system of claim 7, wherein the array of thermoelectric elements includes a device that operates according to the peltier effect.

10. The system of claim 7, wherein the sections of the watch strap sequentially change temperature in response to a signal from an external computing device.

11. A method for operating a thermal haptic feedback (THF) device connected to a computing device, the method comprising:
by a logic circuit of the computing device:
determining that feedback is to be provided by the computing device;
generating a feedback signal for the THF device; and
causing the THF device to change temperature based on the feedback signal, wherein the feedback signal is configured to cause the THF device to periodically turn off and on according to a predetermined pattern.

12. The method of claim 11, further comprising:
receiving a signal from an external computing device, wherein the feedback signal is based on the signal from the external computing device.

13. The method of claim 11, wherein the THF device is incorporated into a housing of the computing device and the feedback signal causes an edge of the housing to gradually change temperature.

14. The method of claim 11, wherein the computing device is a watch that includes a strap, and wherein causing the THF device to change temperature comprises gradually changing the temperature from a first point on the strap to a second point on the strap.

15. The method of claim 14, wherein the THF device is a resistive heating element that extends from the first point on the strap to the second point on the strap.

16. The method of claim 11, wherein the THF device periodically turns off and on according to a predetermined pattern in response to a wireless signal from an external computing device, and wherein the logic circuit generates the feedback signal in response to the wireless signal.

* * * * *